Aug. 24, 1926.
H. H. TIMKEN
1,597,122
SHAFT MOUNTING
Filed July 5, 1924
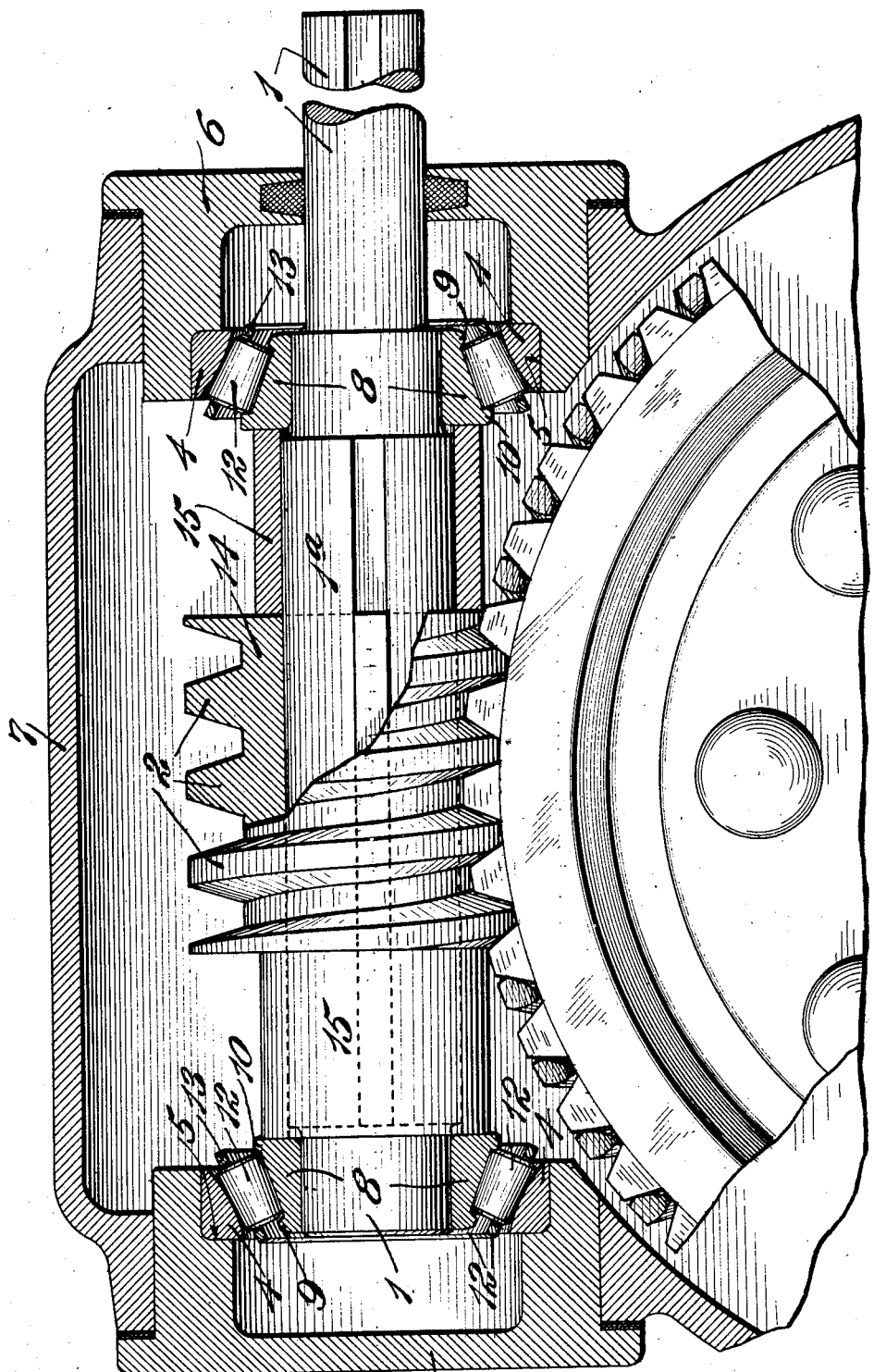
Inventor:
Henry H. Timken,
by (signature)
his Attorneys.

Patented Aug. 24, 1926.

1,597,122

UNITED STATES PATENT OFFICE.

HENRY H. TIMKEN, OF CANTON, OHIO, ASSIGNOR TO THE TIMKEN ROLLER BEARING COMPANY, OF CANTON, OHIO, A CORPORATION OF OHIO.

SHAFT MOUNTING.

Application filed July 5, 1924. Serial No. 724,304.

My invention relates to the mounting of shafts, especially to such shafts as are submitted in practice to cross-bending stresses. Its principal object is to produce an antifriction bearing that will accommodate itself to bowing of the shaft and will have other advantages hereinafter appearing. It consists principally in mounting the shaft in roller bearings whose cups are convexly curved transversely of the bearing surface; it also consists in the combinations and arrangements of parts hereinafter described and claimed.

The accompanying drawing, wherein like numerals refer to like parts wherever they occur, is a longitudinal sectional view of a mechanism embodying a worm shaft mounted in bearings according to my invention.

The drawing illustrates the mounting of a propeller shaft of an automobile in engagement with the larger gear of differential mechanism as commonly used in connection with an automobile driving axle. In the construction illustrated, the propeller shaft 1 comprises a worm 2 that meshes with a worm gear 3 on the differential mechanism; and the ends of the propeller shaft are mounted in roller bearings whose cups or outer raceways 4 are mounted in seats 5 provided therefor in caps 6 movably mounted in the differential gear carrier 7 in accordance with well known practice.

According to the present invention, each of the roller bearings comprises a cone or inner bearing member 8 provided with an annular rib 9 at its small end and with an annular rib or shoulder 10 at its large end, against which abut the beveled ends 11 of conical rollers 12. These cones 8 are mounted on opposite ends of the shaft 1 with their large ends towards each other; and the rollers are provided with a suitable cage 13 for holding them in position on the cone. The rollers are of conical form with their large ends towards each other. The cup or outer bearing member 4 has its inner surface or raceway curved transversely, that is, longitudinally of its axis, whereby the rollers, which have a line contact their full length with the cone or inner raceway, have only a limited or point contact with the cup or outer raceway to which they are practically tangent.

In the construction illustrated, the propeller shaft comprises the shaft proper 1ª and a hollow sleeve 14 which has the worm formed thereon and fits and is keyed to the shaft proper. By this arrangement, the sleeve is locked against rotation independently of the shaft proper, but can slide endwise thereof. Opposite each end of the worm sleeve are sleeves or tubular distance pieces 15 that surround the shaft proper and bear against the adjacent ends of the worm sleeve respectively; and beyond these tubular distance pieces the shaft proper is reduced in diameter and provided with the respective bearing cones against which said tubular distance pieces abut. As stated above, the cups or outer bearing members are seated in recesses provided therefor in caps 6 that are mounted in the axle housing or differential gear carrier so as to be adjustable longitudinally of the propeller shaft.

By this arrangement, the movement of one cap 6 or the other carries with it the cup or outer raceway 4 mounted therein, and this movement is transmitted endwise through the rollers 12, the cone or inner raceway 8 and the tubular adjusting sleeves 15 to the worm sleeve 14, and thence in reverse order to the outer raceway of the other bearing; and as the same relation exists with respect to the other cap, it is a simple matter to position the worm and adjust the bearings as desired.

As is well known, a worm shaft exerts considerable end thrust against one or the other of its end bearings according as it is moving forwardly or backwardly; and it is obvious that the construction and arrangement hereinbefore described are well adapted to take care of such end thrust. Likewise, it is well known that the reaction of the worm gear against the worm shaft exerts considerable force tending to bend or bow such shaft; and the construction hereinbefore described is well adapted to accommodate any such bending or bowing of the shaft. In such case, the bearing cones together with the rollers follow the shaft, whereas the cups or outer raceways maintain their normal positions with reference to the housing; that is, when the shaft bows, the axes of the bearing cones cock from their original position of alinement with each other to positions that are tangent to the arc or curve assumed by the bowed shaft, whereas the cups or outer raceways remain in axial alinement with each other. In this action, the rollers maintain their normal relation to the cones but rock on the convex outer raceway, to which they are substantially tangent in all positions.

One of the advantages of the construction hereinbefore described is that it permits the use of narrower shafts than have heretofore been permissible, for rigidity, which has heretofore been regarded as a practical necessity for a shaft, may be disregarded to a considerable extent. Consequently, the shaft may be made much more economically than has heretofore been practicable. As for the bearings, they have the advantage of being more economical than the common type of roller bearings by reason of the fact that the rollers have only limited contact with the outer raceway and therefore the parts of the bearing do not need to be made with the same degree of precision as is necessary where the rollers make line contact their full length with both the inner and outer raceways. In like manner, the construction has the advantage of minimizing the effects of inaccuracies in the alinement of the bearings.

Obviously, my invention is applicable to other types of gearing as well as worm gearing and is not limited to the details of construction illustrated in the drawing which represents only one embodiment of the invention. For instance, instead of making the cup with a transverse convexity, the cone may be made with such a convexity, and the bearing surface of the cup may be made in the form of a cone.

What I claim is:

1. The combination of a shaft, a rigid support therefor and widely spaced conical roller bearings for said shaft, said bearings each comprising a bearing cone fixed to the shaft, conical rollers and an outer raceway rigidly mounted in said support beyond said cones and whose bearing surface is convexly curved transversely thereof.

2. The combination of a shaft subject to cross-bending stress, and conical roller bearings for the end portions of said shaft, said bearings each comprising a bearing cone fixed to the shaft, conical rollers and an outer raceway whose bearing surface is convexly curved transversely thereof.

3. The combination of a worm shaft and a worm gear meshing therewith of conical roller bearings for said shaft on opposite sides of its worm, said bearings each comprising a bearing cone fixed to the shaft, conical rollers and an outer raceway whose bearing surface is convexly curved transversely thereof, said bearing cones being disposed with their large ends towards each other.

4. The combination with a driving shaft having a gear intermediate its ends, and antifriction bearings for rotatably supporting portions of said shaft on opposite sides of said gear, each of said bearings comprising an inner bearing member, an outer bearing member and bearing rollers disposed between said bearing members, the bearing surface of one of said bearing members being convexly curved in a direction lengthwise of the bearing axis.

5. The combination with a driving shaft having a gear intermediate its ends, and antifriction bearings for rotatably supporting portions of said shaft on opposite sides of said gear, each of said bearings comprising an inner bearing member, an outer bearing member and bearing rollers disposed between said bearing members, said bearing rollers having line contact with one of said bearing members and having point contact with the other of said bearing members substantially midway between the ends of said rollers.

6. In combination, a shaft, a hollow worm slidably mounted thereon, a worm gear meshing with said worm, roller bearings for said shaft on opposite sides of its worm, said bearings each comprising an inner bearing member mounted on the shaft, rollers and an outer bearing member whose bearing surface is convexly curved transversely thereof and elongated sleeves slidably mounted on said shaft between and bearing against the ends of said worm and the respective inner bearing members.

7. In combination, a shaft, a hollow worm slidably mounted thereon, a worm gear meshing with said worm, conical roller bearings for said shaft on opposite sides of its worm, said bearings each comprising a bearing cone mounted on the shaft, conical rollers and an outer raceway whose bearing surface is convexly curved transversely thereof and elongated sleeves slidably mounted on said shaft between and bearing against the ends of said worm and the respective bearing cones.

Signed at Canton, Ohio, this 1st day of July 1924.

HENRY H. TIMKEN.